US010453461B1

(12) United States Patent
Mutagi et al.

(10) Patent No.: US 10,453,461 B1
(45) Date of Patent: Oct. 22, 2019

(54) REMOTE EXECUTION OF SECONDARY-DEVICE DRIVERS

(71) Applicant: Amazon Technologies, Inc., Seattle, WA (US)

(72) Inventors: Rohan Mutagi, Redmond, WA (US); Michael Dale Whiteley, Redmond, WA (US); He Lu, Bothell, WA (US); Brian James Butler, Seattle, WA (US); Fred Torok, Seattle, WA (US); Willy Lew Yuk Vong, Seattle, WA (US); David Ross Bronaugh, Seattle, WA (US); Christopher Ryan Nies, Seattle, WA (US); Shikher Sitoke, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/752,134

(22) Filed: Jun. 26, 2015

Related U.S. Application Data

(60) Provisional application No. 62/134,465, filed on Mar. 17, 2015.

(51) Int. Cl.
*G10L 17/22* (2013.01)

(52) U.S. Cl.
CPC .................................. *G10L 17/22* (2013.01)

(58) Field of Classification Search
None
See application file for complete search history.

(56) References Cited

U.S. PATENT DOCUMENTS

| 5,086,385 | A | 2/1992 | Launey et al. |
| 5,307,295 | A | 4/1994 | Taylor et al. |
| 6,052,750 | A | 4/2000 | Lea |
| 6,654,720 | B1 | 11/2003 | Graham et al. |
| 6,725,281 | B1 | 4/2004 | Zintel et al. |
| 6,812,881 | B1 | 11/2004 | Mullaly et al. |

(Continued)

OTHER PUBLICATIONS

Bendersky, "Finite State Machines and Regular Expressions", Retreived from >>http://www.gamedev.net/page/resources/_/technical/general-programming/finite-state-machines-and-regular-expressionsr3176>>, GameDev.net, Jun. 2013, 31 pages.

(Continued)

*Primary Examiner* — Jonathan C Kim
(74) *Attorney, Agent, or Firm* — Lee & Hayes, P.C.

(57) ABSTRACT

Techniques for remotely executing a secondary-device driver for generating commands for a secondary device are described herein. For instance, a secondary device (or "appliance") may reside within an environment, along with a device to which the secondary device communicatively couples. The device may be configured to send control signals to the secondary device for causing the secondary device to perform certain operations. For instance, a user in the environment may provide, to the device, a request that the secondary device perform a certain operation. The device, which may lack some or all of a device driver associated with the secondary device, may then work with a remote service that executes the device driver for the purpose of receiving a command from the device driver and sending the command along to the secondary device. Upon receiving the command, the secondary device may perform the operation.

20 Claims, 7 Drawing Sheets

(56) References Cited

U.S. PATENT DOCUMENTS

| | | |
|---|---|---|
| 7,139,716 B1 | 11/2006 | Gaziz |
| 7,418,392 B1 | 8/2008 | Mozer et al. |
| 8,078,290 B2 | 12/2011 | Nelson |
| 8,116,754 B2 | 2/2012 | Kim et al. |
| 8,340,975 B1 | 12/2012 | Rosenberger |
| 8,490,006 B1 | 7/2013 | Reeser et al. |
| 8,516,087 B2 | 8/2013 | Wilson et al. |
| 8,850,346 B2 | 9/2014 | Keenan, Jr. et al. |
| 9,071,603 B1 | 6/2015 | Frederick et al. |
| 9,087,514 B2 | 7/2015 | Jonsson |
| 9,241,257 B1 | 1/2016 | Kim et al. |
| 9,443,527 B1 | 9/2016 | Watanabe et al. |
| 9,554,061 B1 | 1/2017 | Proctor, Jr. et al. |
| 9,680,646 B2 | 6/2017 | Nadathur et al. |
| 2001/0041982 A1 | 11/2001 | Kawasaki et al. |
| 2003/0012168 A1 | 1/2003 | Elson et al. |
| 2003/0040812 A1 | 2/2003 | Gonzales et al. |
| 2003/0103088 A1 | 6/2003 | Dresti et al. |
| 2004/0070491 A1 | 4/2004 | Huang et al. |
| 2004/0267385 A1 | 12/2004 | Lingemann |
| 2005/0071879 A1 | 3/2005 | Haldavnekar et al. |
| 2005/0096753 A1 | 5/2005 | Arling et al. |
| 2006/0080408 A1 | 4/2006 | Istvan et al. |
| 2006/0123053 A1 | 6/2006 | Scannell, Jr. |
| 2006/0248557 A1 | 11/2006 | Stark et al. |
| 2007/0260713 A1 | 11/2007 | Moorer et al. |
| 2008/0037485 A1 | 2/2008 | Osinga et al. |
| 2008/0064395 A1 | 3/2008 | Sibileau |
| 2008/0313299 A1 | 12/2008 | Ebbe et al. |
| 2009/0046715 A1 | 2/2009 | McCoy |
| 2009/0076827 A1 | 3/2009 | Bulitta et al. |
| 2010/0104255 A1 | 4/2010 | Yun et al. |
| 2010/0185445 A1 | 7/2010 | Comerford et al. |
| 2010/0289643 A1 | 11/2010 | Trundle et al. |
| 2011/0044438 A1 | 2/2011 | Wang et al. |
| 2011/0087726 A1* | 4/2011 | Shim ............ G06F 9/5072 709/203 |
| 2011/0190913 A1 | 8/2011 | Van De Sluis |
| 2011/0205965 A1* | 8/2011 | Sprigg ............ G06F 9/4411 370/328 |
| 2011/0211584 A1 | 9/2011 | Mahmoud |
| 2012/0253824 A1 | 10/2012 | Alcantara Talavera |
| 2013/0010207 A1* | 1/2013 | Valik ............ G06F 3/017 348/734 |
| 2013/0052946 A1 | 2/2013 | Chatterjee et al. |
| 2013/0183944 A1 | 7/2013 | Mozer et al. |
| 2013/0188097 A1 | 7/2013 | Smith |
| 2013/0218572 A1 | 8/2013 | Cho et al. |
| 2014/0005809 A1 | 1/2014 | Frei et al. |
| 2014/0062297 A1 | 3/2014 | Bora et al. |
| 2014/0074653 A1 | 3/2014 | Wang et al. |
| 2014/0082151 A1 | 3/2014 | Chen et al. |
| 2014/0098247 A1 | 4/2014 | Rao et al. |
| 2014/0163751 A1 | 6/2014 | Davis et al. |
| 2014/0167929 A1 | 6/2014 | Shim et al. |
| 2014/0176309 A1 | 6/2014 | Wang et al. |
| 2014/0191855 A1 | 7/2014 | Kim et al. |
| 2014/0244267 A1 | 8/2014 | Levi |
| 2014/0249825 A1 | 9/2014 | Proud |
| 2014/0309789 A1 | 10/2014 | Ricci |
| 2014/0343946 A1 | 11/2014 | Torok et al. |
| 2014/0349269 A1 | 11/2014 | Canoy et al. |
| 2014/0358553 A1* | 12/2014 | Helmke ............ G10L 15/22 704/275 |
| 2014/0376747 A1 | 12/2014 | Mullet et al. |
| 2015/0005900 A1 | 1/2015 | Steele et al. |
| 2015/0019714 A1 | 1/2015 | Shaashua et al. |
| 2015/0020191 A1 | 1/2015 | Vida et al. |
| 2015/0066516 A1* | 3/2015 | Nishikawa ............ F24C 7/08 704/275 |
| 2015/0097663 A1 | 4/2015 | Sloo et al. |
| 2015/0140990 A1 | 5/2015 | Kim et al. |
| 2015/0142704 A1 | 5/2015 | London |
| 2015/0154976 A1 | 6/2015 | Mutagi |
| 2015/0161370 A1 | 6/2015 | North et al. |
| 2015/0162006 A1* | 6/2015 | Kummer ............ G07C 9/00571 704/275 |
| 2015/0163412 A1 | 6/2015 | Holley et al. |
| 2015/0170665 A1 | 6/2015 | Gundeti et al. |
| 2015/0195099 A1 | 7/2015 | Imes et al. |
| 2015/0204561 A1 | 7/2015 | Sadwick et al. |
| 2015/0222517 A1 | 8/2015 | McLaughlin et al. |
| 2015/0242381 A1 | 8/2015 | Oh et al. |
| 2015/0264322 A1 | 9/2015 | Ang |
| 2015/0294086 A1 | 10/2015 | Kare et al. |
| 2015/0312113 A1 | 10/2015 | Forutanpour et al. |
| 2015/0324706 A1 | 11/2015 | Warren |
| 2015/0334554 A1 | 11/2015 | Song et al. |
| 2015/0347683 A1 | 12/2015 | Ansari et al. |
| 2015/0348551 A1 | 12/2015 | Gruber et al. |
| 2015/0350031 A1 | 12/2015 | Burks et al. |
| 2015/0351145 A1 | 12/2015 | Burks et al. |
| 2015/0365217 A1 | 12/2015 | Scholten et al. |
| 2015/0373149 A1 | 12/2015 | Lyons |
| 2016/0042748 A1 | 2/2016 | Jain et al. |
| 2016/0043962 A1 | 2/2016 | Kim et al. |
| 2016/0044032 A1 | 2/2016 | Kim et al. |
| 2016/0098284 A1 | 4/2016 | Herberg et al. |
| 2016/0134737 A1 | 5/2016 | Pulletikurty |
| 2016/0139575 A1 | 5/2016 | Funes |
| 2016/0195856 A1 | 7/2016 | Spero |
| 2016/0344815 A1 | 11/2016 | Hyun et al. |
| 2016/0359629 A1 | 12/2016 | Nadathur et al. |
| 2016/0366481 A1 | 12/2016 | Lim et al. |
| 2017/0055126 A1 | 2/2017 | O'Keeffe |

OTHER PUBLICATIONS

Office action for U.S. Appl. No. 14/752,198, dated Mar. 10, 2016, Mutagi et al., "Grouping Devices for Voice Control", 17 pages.

Office action for U.S. Appl. No. 14/752,257, dated Mar. 14, 2016, Mutagi et al., "Mapping Device Capabilities to a Predefined Set", 19 pages.

Office action for U.S. Appl. No. 14/752,321, dated Mar. 23, 2016, Mutagi et al., "Creating Scenes from Voice-Controllable Devices", 21 pages.

Ranger, "What is Apple iBeacon? Here's what you need to know", ZDNet, retreived at >>http://www.zdnet.com/article/what-is-apple-ibeacon-heres-what-you-need-to-know/>>, Jun. 10, 2014, 4 pages.

Office action for U.S. Appl. No. 14/752,321, dated Oct. 4, 2016, Mutagi et al., "Creating Scenes from Voice-Controllable Devices", 39 pages.

Office action for U.S. Appl. No. 14/752,257, dated Nov. 28, 2016, Mutagi et al., "Mapping Device Capabilities to a Predefined Set", 32 pages.

Office action for U.S. Appl. No. 14/752,198, dated Dec. 2, 2016, Mutagi et al., "Grouping Devices for Voice Control", 33 pages.

Office action for U.S. Appl. No. 14/752,321, dated May 25, 2017, Rohan Mutagi, "Creating Scenes from Voice-Controllable Devices", 45 pages.

Office action for U.S. Appl. No. 14/752,198, dated Jun. 30, 2017, Mutagi et al., "Grouping Devices for Voice Control", 43 pages.

Office Action for U.S. Appl. No. 14/750,266, dated Nov. 30, 2017, Mutagi, "Remote Execution of Secondary-Device Drivers", 29 pages.

Office action for U.S. Appl. No. 14/752,198, dated Dec. 26, 2017, Mutagi et al., "Grouping Devices for Voice Control", 20 pages.

Office action for U.S. Appl. No. 14/752,321, dated Dec. 26, 2017, Mutagi, "Creating Scenes from Voice-Controllable Devices", 47 pages.

Office Action for U.S. Appl. No. 14/752,257, dated Aug. 11, 2017, Rohan, "Mapping Device Capabilities to a Set", 51 pages.

Krishna et al., "ZIGBEE Based Voice Control System for Smart Home", IJCTA, Jan.-Feb. 2012, vol. 3, pp.#163-pp.#168.

Office Action for U.S. Appl. No. 14/788,327, dated Apr. 10, 2018, Raeber et al., "Interoperability of Secondary-Device Hubs", 15 pages.

(56) References Cited

OTHER PUBLICATIONS

Office Action for U.S. Appl. No. 14/750,266, dated Jun. 28, 2018, Froment, "Determining Relative Positions of User Devices", 32 pages.
Office Action for U.S. Appl. No. 14/788,327, dated Sep. 12, 2018, Raeber et al., "Interoperability of Secondary-Device Hubs", 13 pages.
Office Action for U.S. Appl. No. 14/750,266, dated Jan. 11, 2019, Fremont et al, "Determining Relative Positions of User Devices", 34 pages.
Office Action for U.S. Appl. No. 14/752,321, dated Jan. 25, 2019, Mutagi et al, "Creating Scenes from Voice-Controllable Devices", 51 pages.

* cited by examiner

REMOTE EXECUTION OF SECONDARY-DEVICE DRIVERS

RELATED APPLICATION

This application claims the benefit of priority to provisional U.S. Patent Application Ser. No. 62/134,465, filed on Mar. 17, 2015 and entitled "Remote Execution of Appliance Drivers", which is herein incorporated by reference in its entirety.

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech input and gestures.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for remotely executing a secondary-device driver configured to generate commands for a secondary device are described herein. For instance, a secondary device (or "appliance") may reside within an environment, along with a device that communicatively couples with the secondary device. The device may be configured to send control signals to the secondary device for causing the secondary device to perform certain operations. For instance, a user in the environment may provide, to the device, a request that the secondary device perform a certain operation. The device, which may lack some or all of a device driver associated with the secondary device, may then work with a remote service that executes the device driver for the purpose of generating a command configured to instruct the secondary device to perform the requested operation. The device then receives the command from the device driver and sends the command along to the secondary device. Upon receiving the command, the secondary device may perform the operation.

For instance, envision that a voice-controlled device resides within an environment along with a secondary device, a light, that communicatively couples (e.g., wirelessly) with the voice-controlled device. Envision also that a user provides a voice command to the voice-controlled device to "please turn on the kitchen light". In response to generating an audio signal based on audio that includes this command, the voice-controlled device may perform speech recognition on the audio signal to identify the voice command or may provide the audio signal to a remote service for identifying the voice command. In either instance, the remote service may receive, over a network, an indication of the user's request and may identify the secondary device that the user is attempting to control, as well as the requested operation. That is, the remote service may identify that the user is attempting to "turn on" his "kitchen light". In response, the remote service may determine the particular addressable light referenced by the user as his "kitchen light". For example, the remote service may identify the user or the device that sent the indication of the request, as well as the description of the secondary device ("kitchen light") to determine the exact secondary device being referenced. In another example, the remote service may identify the secondary device based on one or more additional or alternative factors, such as the identity and/or location of the device from which the request was received. For instance, if a request to "turn on my light" is received from a voice-controlled device located in a particular room, the remote service may identify this location of the device, may identify one or more lights located in the same room, and may determine that these lights are the lights being referenced in the voice command.

After identifying the secondary device, the remote service may identify the device driver associated with the secondary device. For instance, the remote service may determine, after identifying the secondary device, the type of secondary device and, hence, the type of device driver configured to generate commands that are actionable by the secondary device. The remote service may then may provide information indicative of the requested operation to this secondary-device driver, which may be stored on the remote service or at another device remote from the user's environment. In response to receiving an indication of the requested operation, the secondary-device driver corresponding to the user's "kitchen light" generates a command, which the remote service (or another device) then provides, over the network, to the voice-controlled device that initiated the request. That is, the device driver generates a command that is executable by the secondary device and the remote service then sends this command back to the voice-controlled device to which the user initially expressed the request.

Upon receiving the command, the voice-controlled device may issue the command to the secondary device via the communication protocol over which the voice-controlled device and the secondary device communicate. For instance, the voice-controlled device may issue the command over a wired network, a short-range wireless communication network (e.g., Bluetooth, Zigbee, etc.), or over another wireless communication network (e.g., WiFi). Upon receiving the command, the secondary device performs the operation specified by the command. Therefore, in the current example, the kitchen light receives the command generated by the secondary-device driver and sent by the voice-controlled device and, thereafter, executes the command, resulting in the kitchen light transitioning from the OFF state to the ON state.

With use of the afore-mentioned techniques, a user is able to issue a voice command to a device, which in turn causes a secondary device to perform the operation, without the device needing to itself store and execute a device driver associated with the secondary device. As the number of "smart appliances" continues to grow, so does the corresponding number of device drivers needed for generating the appropriate commands for interacting with these smart appliances (or "secondary devices"). However, because the user-side device is able to communicate with the remote service in the manner described above, the user-side device need not be programmed with this large amount of driver information. Instead, the remote service may simply be updated as new drivers are written (e.g., as more secondary appliances are made available), which is then accessible to devices that control secondary devices within their respective environments. As such, users may acquire new secondary devices without needing to program other devices (e.g., the voice-controlled device discussed above) with each new corresponding secondary-device driver.

While the above example describes the secondary device as a light, the secondary device may comprise any other appliance in other instances, such as a television, an audio system, a lock, a garage door opener, a washing machine, a dryer, a dishwasher, a coffee maker, a refrigerator, a door, motorized window shades, a telephone, a tablet, or the like. Each of these secondary devices may communicatively couple to a controlling device of a user, such as the voice-controlled device described above. Furthermore, the device configured to couple with and control the secondary device (and configured to interact with the remote service) may comprise the voice-controlled device described above, a tablet computing device, a mobile phone, a laptop computer, a desktop computer, a set-top box, a vision-based device, or the like. In some instances, a user is able to interact with a vision-based device that includes a camera. That is, a user may, in some instances, perform a gesture to perform an operation on a secondary device, while the user's device may capture one or more images of the user performing the gesture. The device or the remote service may then identify the gesture requesting the operation, generate a corresponding command using the remote secondary-device driver, and send the command back to the device for sending to the secondary device. Further, while a few example environments are described, it is to be appreciated that the described techniques may be implemented in other environments. Further, it is to appreciated that the term "environment" may include a location of a user, one or more user-side devices, one or more server-side devices, and/or the like.

Furthermore, while the above examples describe a user requesting to perform an operation, in other instances a device may initiate a process for causing a secondary device to perform an operation. For instance, a device may be programmed to perform a certain operation upon one or more conditions being met, such as a user being detected in an environment, a time of day occurring, or the like. For instance, a motion sensor may detect the presence of a user and may initiate a process for causing a light to turn on.

Figure 1:
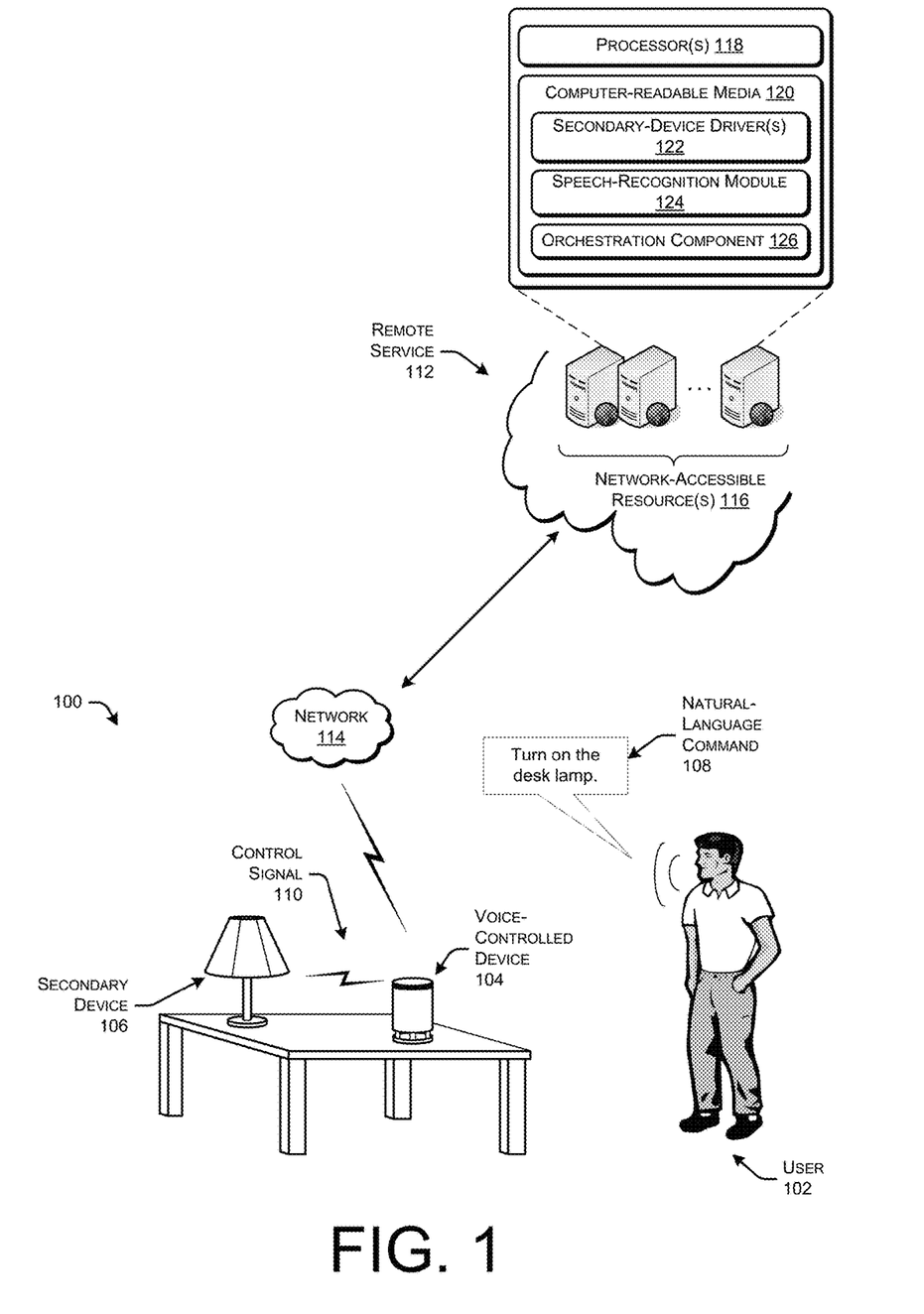
FIG. 1 is a schematic diagram of an illustrative environment in which a user issues a voice command to a device to perform an operation on a secondary device (in this case a lamp). In this example, the device communicates with a remote service, which executes a device driver associated with the secondary device and which provides a command generated by the device driver back to the device. The device in turn passes the generated command to the secondary device, thus causing the secondary device to perform the operation.

FIG. 1 is an illustration of an example scenario 100 in which a user 102 utilizes a voice-controlled device 104 to control a secondary device 106. In FIG. 1, the secondary device is illustrated as a desk lamp. FIG. 1 is provided to aid in comprehension of the disclosed techniques and systems. As such, it should be understood that the discussion that follows is non-limiting.

As shown in FIG. 1, the user 102 would like to turn on the secondary device 106 using a voice command to the voice-controlled device 104. Accordingly, the user 102 speaks a natural language command 108, such as "Turn on the desk lamp." The sound waves corresponding to the natural language command 108 may be captured by one or more microphone(s) of the voice-controlled device 104. In some implementations, the voice-controlled device 104 may process the captured signal. In other implementations, some or all of the processing of the sound may be performed by additional computing devices (e.g. servers) connected to the voice-controlled device 104 over one or more networks. For instance, in some cases the voice-controlled device 104 is configured to identify a predefined "wake word" (i.e., a predefined utterance). Upon identifying the wake word, the device 104 may begin uploading an audio signal generated by the device to the remote servers for performing speech recognition thereon, as described in further detail below.

Furthermore, and also as discussed in further detail below, one or more servers that are remote from the device 104 may execute a device driver associated with the secondary device 106. Upon identifying the voice command uttered by the user 102, the remote servers may provide information indicative of the requested operation to the device driver (executing remotely from the device), which may in turn generate a command and provide the command back to the voice-controlled device 104. The device 104 may then output a corresponding control signal 110 containing the command to the secondary device 106. In the illustrated example, the secondary request receives the command and, in response, turns on.

FIG. 1 illustrates that the voice-controlled device 104 may couple with a remote service 112 over a network 114. The network 114 may represent an array or wired networks, wireless networks (e.g., WiFi), or combinations thereof. The remote service 112 may generally refer to a network-accessible platform—or "cloud-based service"—implemented as a computing infrastructure of processors, storage, software, data access, and so forth that is maintained and accessible via the network 114, such as the Internet. Cloud-based services may not require end-user knowledge of the physical location and configuration of the system that delivers the services. Common expressions associated with cloud-based services, such as the remote service 112, include "on-demand computing", "software as a service (SaaS)", "platform computing", "network accessible platform", and so forth.

As illustrated, the remote service 112 may comprise one or more network-accessible resources 116, such as servers. These resources 116 comprise one or more processors 118 and computer-readable storage media 120 executable on the processors 118. The computer-readable media 120 may store one or more secondary-device drivers 112, a speech-recognition module 124, and an orchestration component 126. Upon the device 104 identifying the user 102 speaking the predefined wake word (in some instances), the device 104 may begin capturing audio from the environment 100 to generate an audio signal and uploading the audio signal to the remote service 112 over the network 114. In response to receiving this audio signal, the speech-recognition module 124 may begin performing automated speech recognition (ASR) on the audio signal to generate text from which one or more user voice commands may be identified. For instance, in the illustrated example, the speech-recognition module 124 may identify the user requesting to "turn on" his "desk lamp".

Upon the identifying this command (initially spoken by the user 102 as the natural-language command 108), the orchestration component 126 may identify the secondary device that the user is requesting to "turn on". To aid in this identification, the device 104 may send an identifier associated with the device 104 and/or a user account of the user 102 when or approximately when the device 104 uploads the audio signal to the remote service 102. For instance, the device 104 may provide a MAC address, IP address, or other device identifier (DID) identifying the device 104. Additionally or alternatively, the device 104 may provide an identification of the user 102, such as an email address of the user 102, a username of the user 102 at the remote service 112, or the like.

As discussed in further detail below with reference to FIG. 5, the remote service 112 may use this information to identify a set of one or more secondary devices having been registered to an account of the user 102 and/or having been registered as residing with the environment 100. For instance, the user 102 may have initially registered to his or her user account the desk lamp 106, amongst multiple other secondary devices that may be controllable via the voice-controlled device 104 and/or other devices, such as other lights (e.g., smart light bulbs), door locks, doors, window blinds, a coffee maker, a dishwasher, a washing machine, a dryer, a garage door opener, a thermostat, or the like. It is to be appreciated that a user account of the user 102 may be associated with the user 102 and/or other users. In these instances, a user account may include multiple profiles associated with different users, such as a profile associated with a father, another profile associated with a mother, and yet another profile associated with a child in the family. As such, the identifier provided by the device 104 to the remote service 112 may be associated with the user account and/or with one or more profiles of the user account, and may be used to identify this account and/or a profile when sent to the remote service 112 along with the audio signal representative of the natural-language command 108.

In addition, the remote service 112 may utilize a verbal description of the secondary device, in this case "the desk lamp", to determine the secondary device 106 referenced in the natural-language command 108. Here, the user 102 may have initially provided an indication to the remote service 112 that the illustrated desk lamp 106 is to be named "the desk lamp" at the remote service. Therefore, having identified the set of secondary devices associated with the user 102 (using the device or user ID), the remote service 112 may identify from the verbal description the exact addressable secondary device 106. For instance, the service 112 may determine an address of the secondary device 106, such as the IP address, MAC address, or the like of the secondary device 106.

After identifying the secondary device 106 referenced in the natural-language command 108, the remote service 112 may identify a type or class of the secondary device 106 to determine which secondary-device driver is responsible for creating commands for causing the secondary device 106 to perform requested operations. As is known, device drivers represent executable programs that operate and/or control a particular type of device. That is, a device driver for a particular device (in this case a "secondary device") provides a software interface for the secondary device. Because device drivers, including the secondary-device drivers 122, are hardware-dependent, secondary devices (and devices in general) often need custom drivers.

After the remote service 112 identifies the type of the secondary device 106 and, hence, the secondary-device driver associated with the secondary device 106, the remote service 112 (e.g., the orchestration component 126) may provide information indicative of the user's request to the appropriate one of the secondary-device drivers 122. That is, the orchestration component 126 may send, to a secondary-device driver configured to generate commands for the desk lamp 106, an indication that the user 102 has requested to turn on the desk lamp. In response to receiving this information, the secondary-device driver (located remote from the environment 100 of the user 102) may proceed to generate a command to turn on the desk lamp. Therefore, the remote service 112 may send the generated command back to the voice-controlled device 104 to which the user initially the natural-language command 108.

Upon receiving the generated command, the voice-controlled device may pass the command via the control signal 110, to the secondary device 106. In response to receiving the command, the secondary device 106 may proceed to execute the command. In this instance, the desk lamp may turn on.

In some instances, the voice-controlled device 104 is free from some or all of the secondary-device driver associated with the desk lamp 106. Instead, the device 104 includes one or more protocol primitives for communicating with secondary devices, such as the desk lamp 106. For instance, the device 104 may be configured to communicate via short-range wireless radio communication protocols, such as Bluetooth®, Zigbee®, infrared, and the like. As such, the user 102 need not program the device 104 with the secondary-device driver of the desk lamp 106. Instead, the device 104 communicates with the remote service 112 that has access to the secondary-device drivers 122, which in turn provides generated commands back to the device 104 for issuing to the desk lamp. As such, manufacturers of secondary devices and/or other entities may provide the secondary-device drivers to the remote service for use across many environments, such as the environment 100. Therefore, the user 102 may be able to operate multiple secondary devices via the device 104 and/or other client devices without storing the corresponding secondary-device drivers on these user devices.

Furthermore, while the above example describes the voice-controlled device 104 receiving the initial request from the user and thereafter receiving the generated command from the remote service and providing this command to the secondary device 106, other communication paths are possible. For instance, the voice-controlled device 104 (or another device) may receive the initial request from the user and may provide information indicative of this request to the remote service 112 (e.g., in the form of a generated audio signal, an actual voice command if the device 104 performs the speech recognition, or the like). Thereafter, the remote service 112 may generate a command using the appropriate secondary-device driver but may provide this command to a different user device in the environment 100. For instance, if the remote service 112 determines that the desk lamp communicates via a protocol not supported by the voice-controlled device 104, the remote service 112 may provide the generated command to another device (e.g., a tablet computing device in the environment 100) that is able to communicate the command to the desk lamp 106 using the appropriate communication protocol. Or, the voice-controlled device 104 may receive the generated command from the remote service and may provide the command to another device (e.g., the tablet), which may in turn communicate the command to the desk lamp 106.

Figure 2:
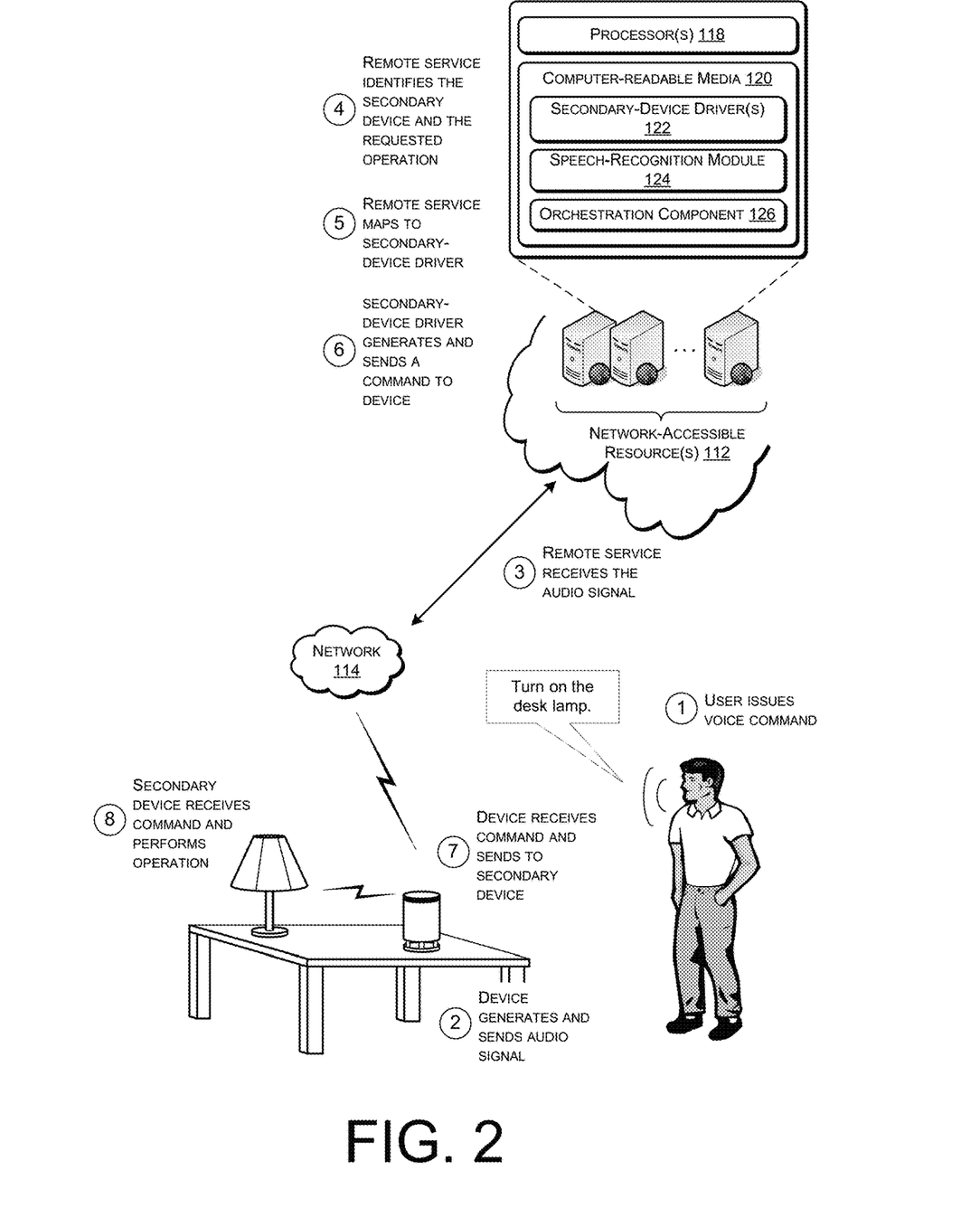
FIG. 2 shows an example process, in the context of the environment of FIG. 1, for a user issuing a voice command to a device, the device communicating with the remote service for receiving a command from a secondary-device driver executing at the remote service, and the device communicating the command to the secondary device, thus causing the secondary device to perform an operation initially requested by the user.

FIG. 2 shows an example process, in the context of the environment of FIG. 1, for a user issuing a voice command to a device, the device communicating with the remote service for receiving a command from a secondary-device driver executing at the remote service, and the device communicating the command to the secondary device, thus causing the secondary device to perform an operation initially requested by the user.

At "1", the user 102 issues the voice command "turn on the desk lamp". In some instances, the user 102 may first uttered a predefined word or phrase that, when recognized, instructs the voice-controlled device 104 to begin performing speech recognition for identifying the voice command or to begin streaming or otherwise providing an audio signal representing sound from the environment to the remote service 112.

At "2", the voice-controlled device 104 generates an audio signal based on the sound within the environment (including the user's voice command) and sends this audio signal to the remote service. At "3", the remote service receives the audio signal and, at "4", identifies, via text generated by ASR, the secondary device referenced in the command as well as the requested operation. For instance, the remote service 112 may utilize information about the identity of the device 104 that provided the audio signal and/or the user 102 that issued the voice command along with the voice command itself to identify the requested operation (turning on a light) and the secondary device (the desk lamp).

At "5", the remote service 112 maps the request to the appropriate secondary-device driver responsible for generating commands for the identified secondary device (the desk lamp). At "6", the secondary-device driver, which may reside at the remote service 112 or at another location remote from the user's environment, may generate a command that is actionable by the desk lamp to cause the desk lamp to turn on. Thereafter, the remote service 112 may send the generated command to the voice-controlled device 104.

At "7", the voice-controlled device 104 receives the command and sends the command to the desk lamp over the appropriate communication protocol. In some instances, the command received from the remote service 112 may indicate the protocol over which it is to be sent. At "8", the secondary device (the desk lamp) receives and executes the command and, therefore, turns on.

Figure 3:
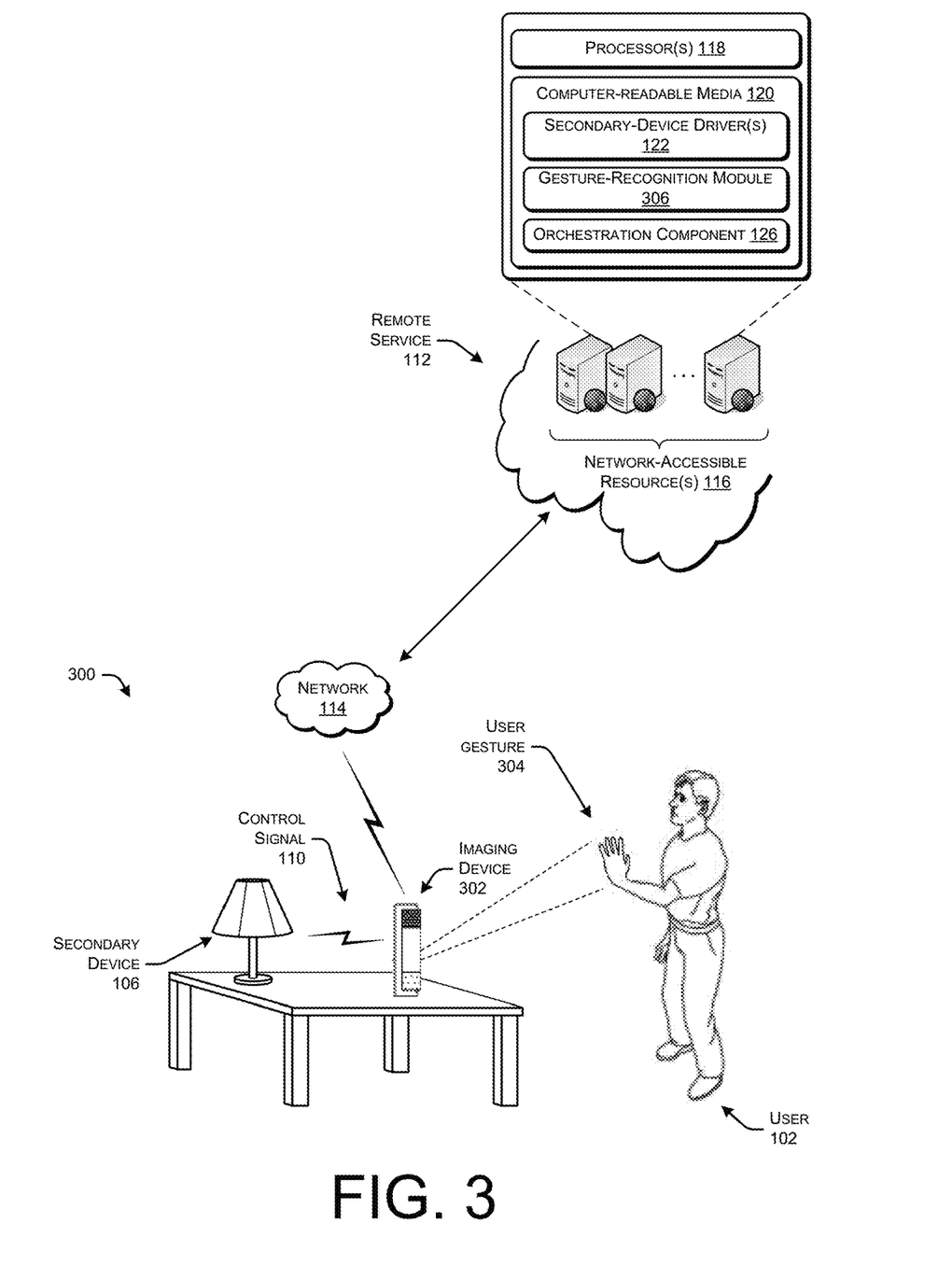
FIG. 3 is a schematic diagram of an illustrative environment in which a user performs a gesture to a device, the gesture representing a request to perform an operation on a secondary device (again, in this case a lamp). In this example, the device communicates one or more captured images to a remote service, which in turn identifies the requested operation from the gesture and passes an indication of this request to a device driver associated with the secondary device. The driver then generates a command, which is in turn passed back to the device. The device in turn passes the generated command to the secondary device, thus causing the secondary device to perform the operation.

FIG. 3 is a schematic diagram of an illustrative environment 300 similar to the environment 100 of FIG. 1. In this instance, however, the user 102 communicates with a device via gestures for causing the secondary device to perform a requested operation. In this example, the environment 300 includes an imaging device 302, which may comprise any sort of device (e.g., a tablet, a set-top box, a laptop computer, etc.) that is configured to capture one or more images of an environment. The imaging device 302 may be configured to capture one or more still images or multiple images of a video. In either case, a user may communicate with the imaging device 302 via predefined gestures. That is, the imaging device 302 may be configured to perform certain operations in response to the user 102 performing certain gestures. In some instances, the imaging device 302 may be configured to cause the secondary device 106, and other secondary devices, to perform certain operations in response to identifying predefined gestures.

In the illustrated example, for instance, the user 102 performs a predefined gesture 304 that is associated with a request to turn on the secondary device 106. The imaging device 302 may capture one or more images of the user 102 performing the user gesture 304 and may either analyze the images to identify the gesture or may provide the images to the remote service 112 for identification. In this instances, the imaging device 302 provides the image(s) to the remote service 112.

As illustrated, the remote service may include, in this example, a gesture-recognition component configured to identify user gestures from images via computer-vision techniques. In this example, the remote service 112 identifies the user performing the user gesture 304, maps that gesture to the request to turn on the desk lamp 306 of the user 102, and routes this request to the appropriate secondary-device driver. Again, this driver may generate the appropriate command and send this command back to the imaging device 302 (or other device in the environment 300). The device 302 may then send the command to the secondary device 106, which may execute the command and turn on.

Figure 4:
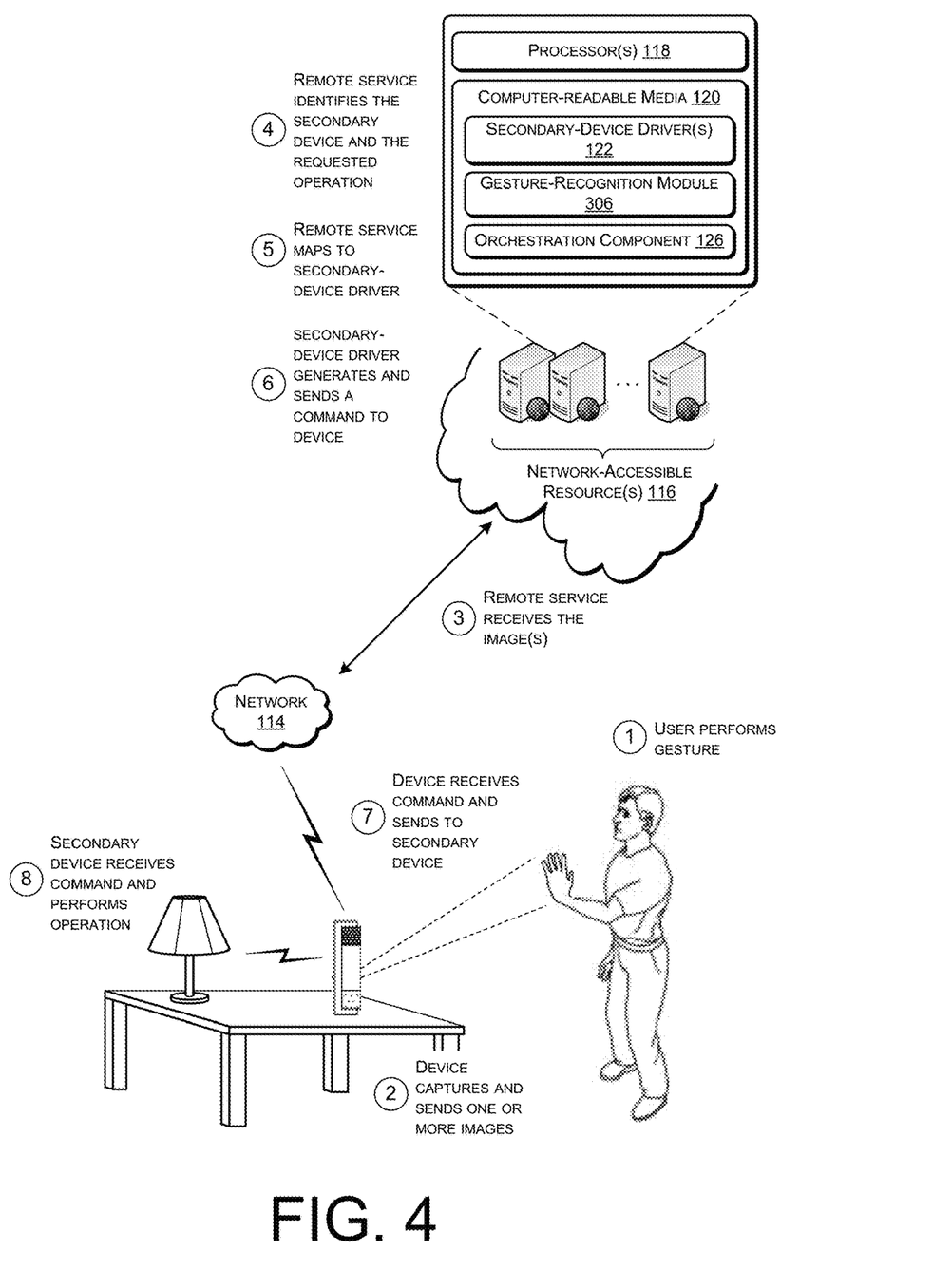
FIG. 4 shows an example process, in the context of the environment of FIG. 3, for a user performing a gesture to a device, the device communicating with the remote service for receiving a command from a secondary-device driver executing at the remote service, and the device communicating the command to the secondary device, thus causing the secondary device to perform an operation initially requested by the user.

FIG. 4 shows an example process, in the context of the environment 300 of FIG. 3. At "1", the user 102 performs the gesture associated with the request to turn on the desk lamp. At "2", the imaging device 302 captures images of the user 102 performing the gesture and sends this information onto the remote service. At "3", the remote service receives the images and, at "4", identifies the secondary device referenced by the gesture as well as the requested operation. For instance, the remote service 112 may utilize information about the identity of the device 104 that provided the images and/or the user 102 that performed the gesture along with the gesture itself to identify the requested operation (turning on a light) and the secondary device (the desk lamp).

At "5", the remote service 112 maps the request to the appropriate secondary-device driver responsible for generating commands for the identified secondary device (the desk lamp). At "6", the secondary-device driver, which may reside at the remote service 112 or at another location remote from the user's environment, may generate a command that is actionable by the desk lamp to cause the desk lamp to turn on. Thereafter, the remote service 112 may send the generated command to the imaging device 302. At "7", the imaging device 302 receives the command and sends the command to the desk lamp over the appropriate communication protocol. In some instances, the command received from the remote service 112 may indicate the protocol over which it is to be sent. At "8", the secondary device (the desk lamp) receives and executes the command and, therefore, turns on.

Figure 5:
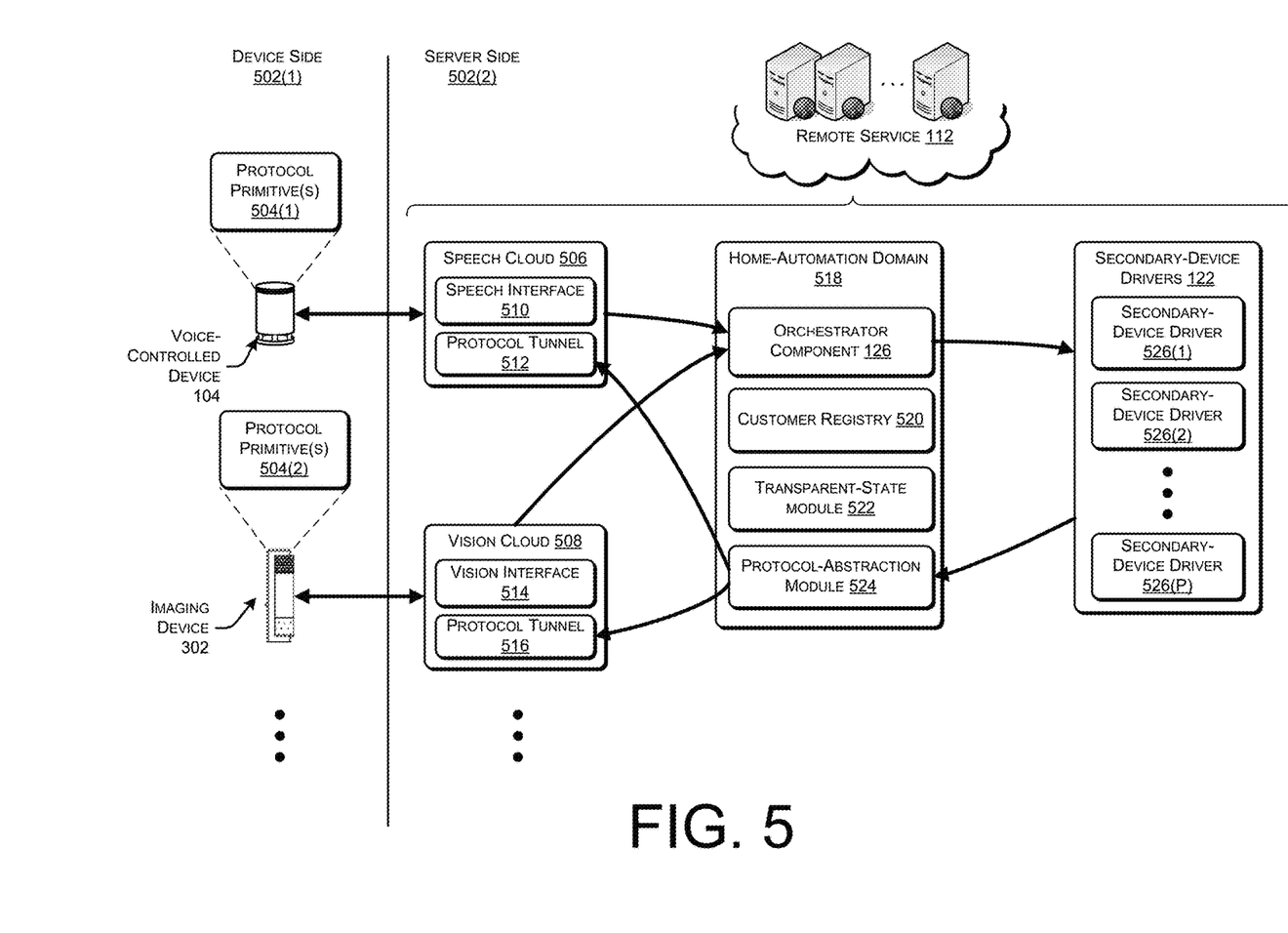
FIG. 5 illustrates example components of the remote service, including secondary-device drivers for an array of secondary devices that may be present in environments, such as the environment of FIG. 1.

FIG. 5 illustrates example components of user devices configured to interact with secondary devices, as well as example components of the remote service 112. As illustrated, FIG. 5 is split into a device-side 502(1), corresponding to user environments, and a server-side 502(2), corresponding to the remote service 112. The device-side 502(1) may include one or more devices configured to requests from users to perform operations to secondary devices in the user environments, interact with the remote service 112 for receiving remotely-generated commands to cause performance of these operations, and send these commands to the secondary devices to cause performance of the operations. FIG. 5, for instance, illustrates that the device-side 502(1) may include the voice-controlled device 104 and the imaging device 302, amongst other possible user devices configured to receive user requests. As illustrated, the voice-controlled device 104 may include a first set of protocol primitives 504(1) enabling communication with secondary devices over a first set of communication protocols, while the imaging device 302 may include a second set of protocol primitives 504(2) enabling communication with secondary devices over a second set of communication protocols.

FIG. 5 further illustrates that the different user devices may communicate with different portions of the remote service 112. For instance, the voice-controlled device 104 may communicate with a speech cloud 506, while the imaging device 302 may communicate with a vision cloud 508. The speech cloud 506 may include a speech interface 510 and a protocol tunnel 512. The speech interface 510 may comprise one or more components configured to receive audio signals generated by the voice-controlled device 104 and perform ASR on the audio signals to generate text from user commands may be identified. After identifying a command from an audio signal, the speech interface 510 may route the request to the appropriate domain at the remote-service. For instance, if a user issues a request to play a certain type of music on the voice-controlled device 104, the speech interface 510 may route the request to a "music domain". If the user issues a request to purchase an item (e.g., more orange juice), the speech interface 510 may route the request to a "shopping domain". In this instance, when the speech interface 510 determines that the user has issued a request to cause a secondary device within the environment of the user to perform a certain operation, the speech interface 510 may route the request to a "home-automation domain 518".

The vision cloud 508, meanwhile, may include a vision interface 514 and a protocol tunnel 516. Again, the vision interface 514 may function to identify requests of the user made via user gestures and route the requests to the appropriate domain. Again, in response to identifying the user performing a gesture related to control of a secondary device, the vision interface 514 may route the request to the home-automation domain 518.

The home-automation domain 518 may include the orchestration component 126, a customer registry 520, a transparent-state module 522, and a protocol-abstraction module 524. The orchestration component 126 may function to route a user's request to the appropriate location within the remote service 112. For instance, the orchestration component 126 may initially receive an indication that a user has orally requested to "turn on" their "desk lamp". As such, the orchestration component may use information regarding the identity of the voice-controlled device 104 and/or the user 102, along with the verbal description of the secondary device to identify the secondary device. Here, the orchestration component 126 may reference the customer registry 520, which may store indications of secondary devices registered with respective user accounts. For instance, when users such as the user 102 initially obtain a secondary device, the respective user may register the secondary device with the remote service 112. For instance, the user 102 may provide an indication to the remote service 112 that the user 102 has obtained a remotely controllable desk lamp, which the user is to call "desk lamp". As part of this registration process, the customer registry 520 may store an indication of the name of the secondary device, along with an IP address associated with the secondary device, a MAC address of the secondary device, or the like.

As such, upon receiving an indication that the user 102 has issued a request to turn on a desk lamp, the orchestration component 126 may initially identify the set of secondary devices associated with the account of the user 102 at the customer registry 520 and may identify the particular secondary device that the user 102 has referenced. The transparent-state module 522, meanwhile, may maintain a current state of secondary devices referenced in the customer registry. For instance, the module 522 may keep track of whether the desk lamp is currently on or off. Finally, the protocol-abstraction module 524 functions to create a tunnel from a secondary-device driver located remotely from a user's environment back to the user environment, as discussed immediately below.

After identifying the addressable secondary device that the user has referenced in a request, the orchestration component 126 may identify the type of the secondary device for the purpose of determining the secondary-device driver used to generate commands for the secondary device. To do so, the orchestration component 126 may reference a database which stores association between device types and respective device drivers and/or between specific devices and respective device drivers. As illustrated, the remote service 112 may further store the secondary-device drivers 122, which may comprise one or more secondary-device drivers 526(1), 526(2), . . . , 526(P) for communicating with an array of secondary devices. After identifying the appropriate driver, the orchestration component 126 may route the request to turn on the desk lamp to the appropriate driver, which may in turn generate the appropriate command. Thereafter, the driver may provide the command back to the device that initially provided the request via the appropriate tunnel. For instance, if the voice-controlled device 104 initially provided the request, the secondary-device driver may provide the command through the protocol-abstraction module 524, which in turn creates the protocol tunnel 512 in the speech cloud 506, which in turn passes the command back to the voice-controlled device 104. The device 104 may then issue the command via the appropriate protocol via the protocol primitives 504(1). For commands that are destined for the imaging device 302, the generated command may be routed to the device 302 via the protocol-abstraction module 524 and the protocol tunnel 516.

Furthermore, while the above example describes commands being routed from the secondary-device drivers back to the home-automation domain 518 and ultimately back to the device that initially received the request from the user to perform the operation, in other instances the secondary-device drivers may route these commands in other ways. For instance, the home-automation domain 518 may send a request to generate a command to one of the secondary-device drivers 122, which may in turn generate the command and route the command back to the environment 100 outside of the channel used to route the request to the driver. In some instances, the driver may route this command to the secondary device that is to execute the command, while in other instances the driver may route this command via the different channel to the device that initially received the user request, which in turn may send this command to the secondary device.

Figure 6:
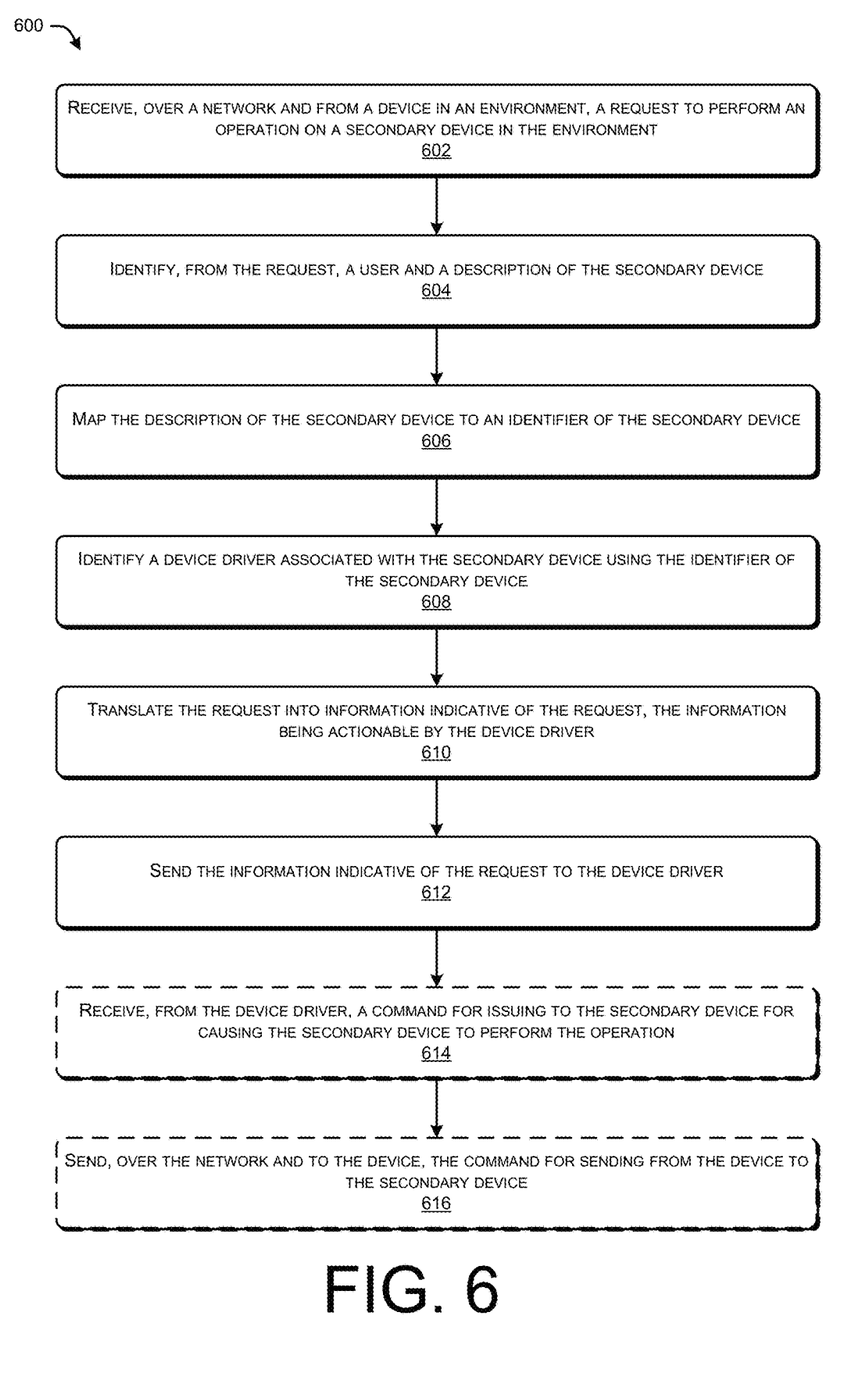
FIG. 6 is a flow diagram of an example process for executing a secondary-device driver remotely from an environment in which the secondary device resides.

FIG. 6 is a flow diagram of an example process 600 for executing a secondary-device driver remotely from an environment in which the secondary device resides. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 602, the process 600 receives, over a network and from a device in an environment, a request to perform an operation on a secondary device in the environment. As described above, a user or a device may initiate this request. For instance, a user may issue a voice command instructing a secondary device to perform an operation. In another example, another device may issue a request that a secondary device perform an operation. For instance, a motion sensor may detect the presence of a user and may initiate a request that a secondary device perform an operation in response. In some instances, the device initiating the request may reside in the same environment in which the secondary device resides, while in other instances the requesting device and the secondary device may be remote from one another.

At 604, the process 600 identifies, from the request, a user account associated with a user that issued the request and a description of the secondary device. At 606, the process 600 maps the user account and the description of the secondary device to an identifier of the secondary device. For instance, the process 600 may determine a MAC address, an IP address, or the like of the secondary device. Additionally or alternatively, the process 600 may determine a device type of the secondary device for determining a device driver capable of interacting with the secondary device At 608, the process 600 then identifies a device driver associated with the secondary device using at least one of the identifier of the secondary device or the determined device type of the secondary device. At 610, the process 600 translates the request to perform the operation into information indicative of the request, with this information being actionable by the device driver. That is, the process 600 may take a user's audible request to "turn on the desk lamp" into instructions executable by the device driver to generate a command that, when executed by the desk lamp, causes the desk lamp to turn on. At 612, the process 600 sends this information indicative of the request to the device driver.

As illustrated by the dashed lines, the process 600 may, in some instances, perform the operations 614 and 616. At 614, the process 600 receives, from the device driver, a command for issuing to the secondary device for causing the secondary device to perform the requested operation. At 616, the process sends, over the network and to the device, the command for causing the secondary device to perform the requested operation. In other instances, meanwhile, the device driver may send the command directly to the secondary device or may route the command to the secondary device via one or more other devices. As such, the device that initially receives the initial user request might not receive the command back from the driver, yet the driver may send this command to the secondary device in another manner.

In some instances, after the secondary device receives and executes the command, the secondary device may send confirmation that it has performed the operation to the device that sent the command. In some of these instances, the device may re-send the command in the event that it does not receive such a confirmation from the secondary device within a threshold amount of time.

Figure 7:
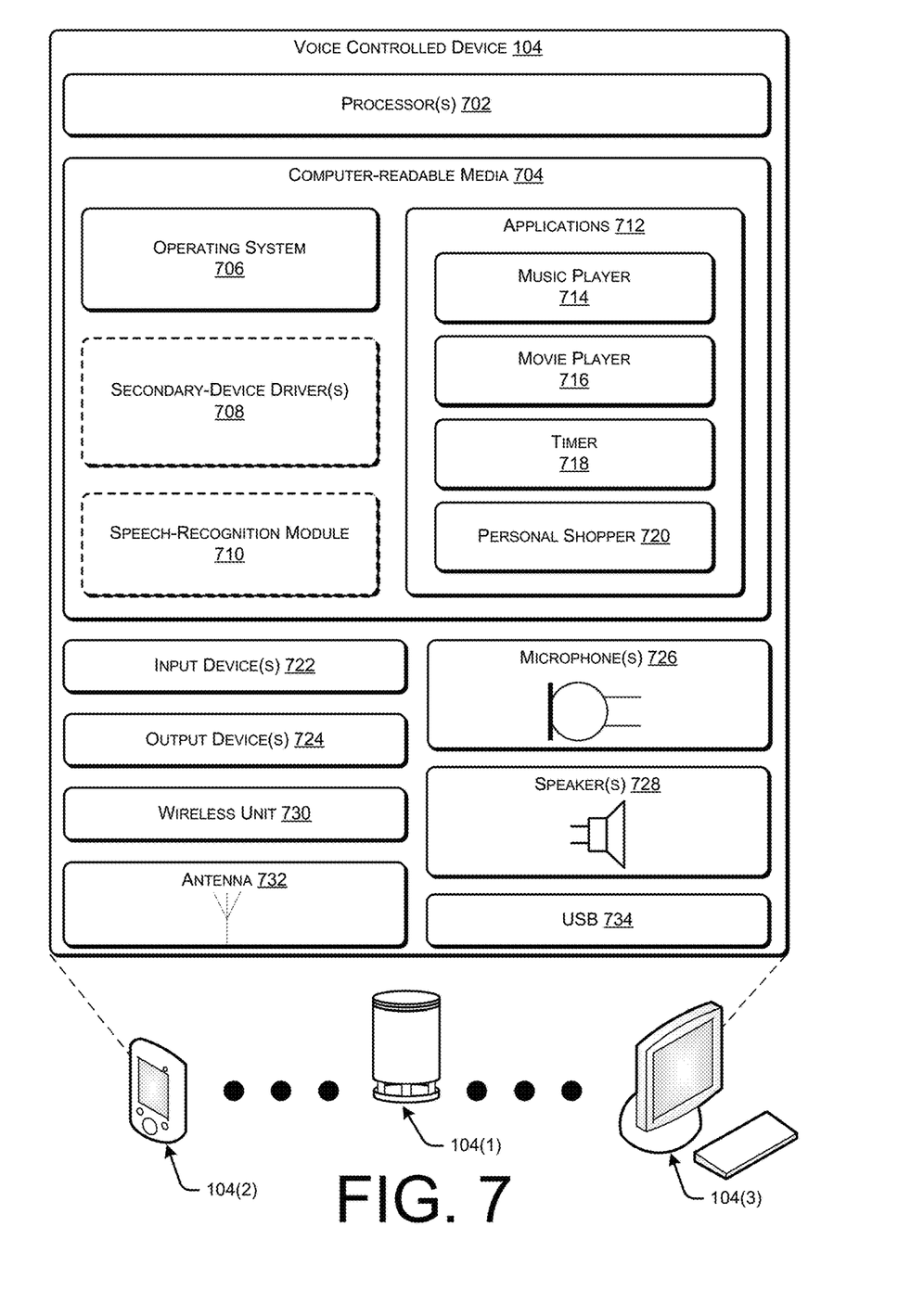
FIG. 7 shows a functional block diagram of selected components implemented at a user device, such as a voice-controlled device.

FIG. 7 shows selected functional components of a natural language input controlled device, such as the voice-controlled device 104. The voice-controlled device 104 may be implemented as a standalone device 104(1) that is relatively simple in terms of functional capabilities with limited input/output components, memory, and processing capabilities. For instance, the voice-controlled device 104(1) does not have a keyboard, keypad, or other form of mechanical input. Nor does it have a display (other than simple lights, for instance) or touch screen to facilitate visual presentation and user touch input. Instead, the device 104(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 104(1) is through voice input and audible output. In some instances, the device 104(1) may simply comprise a microphone, a power source (e.g., a battery), and functionality for sending generated audio signals to another device.

The voice-controlled device 104 may also be implemented as a mobile device 104(2) such as a smart phone or personal digital assistant. The mobile device 104(2) may include a touch-sensitive display screen and various buttons for providing input as well as additional functionality such as the ability to send and receive telephone calls. Alternative implementations of the voice-controlled device 104 may also include configuration as a personal computer 104(3). The personal computer 104(3) may include a keyboard, a mouse, a display screen, and any other hardware or functionality that is typically found on a desktop, notebook, netbook, or other personal computing devices. The devices 104(1), 104(2), and 104(3) are merely examples and not intended to be limiting, as the techniques described in this disclosure may be used in essentially any device that has an ability to recognize speech input or other types of natural language input.

In the illustrated implementation, the voice-controlled device 104 includes one or more processors 702 and computer-readable media 704. In some implementations, the processors(s) 702 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 702 may possess its own local memory, which also may store program modules, program data, and/or one or more operating systems.

The computer-readable media 704 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 704 may be implemented as computer-readable storage media ("CRSM"), which may be any available physical media accessible by the processor(s) 702 to execute instructions stored on the memory 704. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 702.

Several modules such as instruction, datastores, and so forth may be stored within the computer-readable media 704 and configured to execute on the processor(s) 702. A few example functional modules are shown as applications stored in the computer-readable media 704 and executed on the processor(s) 702, although the same functionality may alternatively be implemented in hardware, firmware, or as a system on a chip (SOC).

An operating system module 706 may be configured to manage hardware and services within and coupled to the device 104 for the benefit of other modules. In addition, in some instances the device 104 may include some or all of one or more secondary-device drivers 708. In other instances, meanwhile, the device 104 may be free from the drivers 708 for interacting with secondary devices. The device 104 may further including, in some instances, a speech-recognition module 710 that employs any number of conventional speech processing techniques such as use of speech recognition, natural language understanding, and extensive lexicons to interpret voice input. In some instances, the speech-recognition module 710 may simply be programmed to identify the user uttering a predefined word or phrase (i.e., a "wake word"), after which the device 104 may begin uploading audio signals to the remote service 112 for more robust speech-recognition processing. In other examples, the device 104 itself may, for example, identify voice commands from users and may provide indications of these commands to the remote service 112.

The voice-controlled device 104 may also include a plurality of applications 712 stored in the computer-readable media 704 or otherwise accessible to the device 104. In this implementation, the applications 712 are a music player 714, a movie player 716, a timer 718, and a personal shopper 720. However, the voice-controlled device 104 may include any number or type of applications and is not limited to the specific examples shown here. The music player 714 may be configured to play songs or other audio files. The movie player 716 may be configured to play movies or other audio visual media. The timer 718 may be configured to provide the functions of a simple timing device and clock. The personal shopper 720 may be configured to assist a user in purchasing items from web-based merchants.

Generally, the voice-controlled device 104 has input devices 722 and output devices 724. The input devices 722 may include a keyboard, keypad, mouse, touch screen, joystick, control buttons, etc. In some implementations, one or more microphones 726 may function as input devices 722 to receive audio input, such as user voice input. The output devices 724 may include a display, a light element (e.g., LED), a vibrator to create haptic sensations, or the like. In some implementations, one or more speakers 728 may function as output devices 724 to output audio sounds.

A user 102 may interact with the voice-controlled device 104 by speaking to it, and the one or more microphone(s) 726 captures the user's speech. The voice-controlled device 104 can communicate back to the user by emitting audible statements through the speaker 728. In this manner, the user 102 can interact with the voice-controlled device 104 solely through speech, without use of a keyboard or display.

The voice-controlled device 104 may further include a wireless unit 730 coupled to an antenna 732 to facilitate a wireless connection to a network. The wireless unit 730 may implement one or more of various wireless technologies, such as Wi-Fi, Bluetooth, RF, and so on. A USB port 734 may further be provided as part of the device 104 to facilitate a wired connection to a network, or a plug-in network device that communicates with other wireless networks. In addition to the USB port 734, or as an alternative thereto, other forms of wired connections may be employed, such as a broadband connection.

Accordingly, when implemented as the primarily-voice-operated device 104(1), there may be no input devices, such as navigation buttons, keypads, joysticks, keyboards, touch screens, and the like other than the microphone(s) 726. Further, there may be no output such as a display for text or graphical output. The speaker(s) 728 may be the main output device. In one implementation, the voice-controlled device 104(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 104(1) may be implemented as an aesthetically appealing device with smooth and rounded surfaces, with one or more apertures for passage of sound waves. The device 104(1) may merely have a power cord and optionally a wired interface (e.g., broadband, USB, etc.). As a result, the device 104(1) may be generally produced at a low cost. Once plugged in, the device may automatically self-configure, or with slight aid of the user, and be ready to use. In other implementations, other I/O components may be added to this basic model, such as specialty buttons, a keypad, display, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors; and
one or more computer-readable media storing computer-executable instructions that, when executed on the one or more processors, cause the one or more processors to perform acts comprising:
receiving, over a network and by one or more network-based devices that include the one or more processors and are remote from an environment, an audio signal generated by at least one microphone of a first device residing in the environment, the environment including the first device, a secondary device, and a third device;
receiving an identifier associated with at least one of the first device or a user account associated with the first device;
performing, at the one or more network-based devices, speech recognition on the audio signal to generate text;
identifying, from the text, a request to perform an operation on the secondary device;
identifying, based at least in part on the identifier, the user account associated with the first device;
identifying a set of secondary devices associated with the user account;
identifying, based at least in part on the request and the set of secondary devices, the secondary device to perform the operation;
identifying a device driver configured to generate commands executable by the secondary device;
sending, to the device driver, information indicative of the request to perform the operation on the secondary device, wherein the device driver is stored in the one or more network-based devices that are remote from the environment;
causing the device driver to execute to generate a command configured to cause the secondary device to perform the operation;
identifying a communication protocol utilized by the secondary device;
determining that the third device, associated with the user account and residing in the environment, supports the communication protocol;
receiving, from the device driver, the command to issue to the secondary device to cause the secondary device to perform the operation; and
sending, over the network and based at least in part on the determining, the command to one or more of the first device or the third device for sending, by the third device via the communication protocol, to the secondary device for causing the secondary device to perform the operation.

2. The system as recited in claim 1, the acts further comprising:
identifying a verbal description of the secondary device from the text; and
determining that the verbal description corresponds to the secondary device.

3. A method comprising:
receiving, over a network, by one or more network-based devices, and from a first device residing within an environment remote from the one or more network-based devices, a request to perform an operation on a device in communication with the first device;
identifying, by the one or more network-based devices and based at least in part on data included in the request, a user account associated with the first device;
identifying, by the one or more network-based devices and based at least in part on the data included in the request, a secondary device associated with the user account to perform the operation;
identifying, from a plurality of device drivers, a device driver associated with the secondary device, the device driver stored in one or more network-devices remote from the environment;
sending information indicative of the operation to the device driver;
causing the device driver to execute to generate a command configured to cause the secondary device to perform the operation;
receiving the command from the device driver;
identifying a communication protocol utilized by the secondary device;
determining that a third device, associated with the user account and residing in the environment, supports the communication protocol; and
sending, based at least in part on the determining, the command to one or more of the first device or the third device for the third device to issue the command via the communication protocol to the secondary device to cause the secondary device to perform the operation.

4. The method as recited in claim 3, wherein the secondary device comprises a light, a television, an audio system, a lock, a garage door opener, a washing machine, a dryer, a dishwasher, a coffee maker, a refrigerator, a door, or motorized window shades.

5. The method as recited in claim 2, wherein the receiving of the request comprises:
receiving an audio signal generated by at least one microphone of the first device;
performing speech recognition on the audio signal to generate text; and
identifying the request from the text.

6. The method as recited in claim 5, further comprising translating the request identified via the text into the information indicative of the request, the information indicative of the request being actionable by the device driver to generate the command.

7. The method as recited in claim 2, wherein the receiving of the request comprises:
receiving at least one image generated by at least one camera of the first device; and
identifying the request from the at least one image, the request comprising a gesture of a user.

8. The method as recited in claim 2, wherein the first device and the secondary device are in communication with one another over at least one wireless communication protocol.

9. The method as recited in claim 3, further comprising installing an update to the device driver stored at the one or more network-based devices remote from the environment.

10. The method as recited in claim 3, further comprising:
receiving, from the first device, a request to register the secondary device with the user account; and
in response to receiving the request, storing an association between the secondary device and the user account.

11. The method as recited in claim 3, further comprising translating the request into the information indicative of the operation, wherein the information indicative of the request is actionable by the device driver to generate the command.

12. The method of claim 3, wherein:
the data includes an identifier which indicates at least one of the user account or the first device; and
identifying the user account is based at least in part on the identifier.

13. An apparatus comprising:
one or more network interfaces;
an input component;
one or more processors; and
one or more computer-readable media storing computer-executable instructions that, when executed on the one or more processors, cause the one or more processors to perform acts comprising:
receiving, from the input component, information indicative of a request to perform an operation on a secondary device;
sending the request to one or more network-based devices over the one or more network interfaces, the one or more network-based devices configured to identify the secondary device based at least in part on data in the request;
sending, to the one or more network-based devices, an identifier associated with at least one of the apparatus or a user account associated with the apparatus;
receiving, from the one or more network-based devices, a command generated by a device driver stored in the one or more network-based devices remote from an environment in which the apparatus resides and associated with the secondary device, the command to cause the secondary device to perform the operation;
identifying a communication protocol utilized by the secondary device;
determining that a third device, associated with the user account and residing in the environment, supports the communication protocol; and
sending, over the one or more network interfaces and based at least in part on the determining, the command to the third device to issue the command to the secondary device to cause the secondary device to perform the operation.

14. The apparatus as recited in claim 13, wherein the one or more computer-readable media of the apparatus is free from storing at least a portion of the device driver configured to generate the command for causing the secondary device to perform the operation.

15. The apparatus as recited in claim 13, wherein the input component comprises a microphone, and the request comprises a voice command.

16. The apparatus as recited in claim 13, wherein the input component comprises a camera, and the request comprises a gesture.

17. The apparatus as recited in claim 13, wherein the one or more network interfaces comprise a short-range wireless communication interface, and the sending of the command is over the short-range wireless communication interface.

18. The apparatus as recited in claim 13, wherein the secondary device comprises a light, a television, an audio system, a lock, a garage door opener, a washing machine, a dryer, a dishwasher, a coffee maker, a refrigerator, a door, or motorized window shades.

19. The apparatus as recited in claim 13, further comprising a speaker to output at least one of an indication that the apparatus has received the request to perform the operation on the secondary device or an indication that the command to cause the secondary device to perform the operation has been or will be sent to the secondary device.

20. The apparatus as recited in claim 13, the acts further comprising sending an identifier of the apparatus to the one or more network-based devices, the one or more network-based devices to identify at least one of an address or a device type of the secondary device using the identifier of the apparatus and to identify the device driver associated with the secondary device using the at least one of the address or the device type of the secondary device.

* * * * *